United States Patent
Shanmuganathan et al.

(10) Patent No.: US 9,389,924 B2
(45) Date of Patent: Jul. 12, 2016

(54) SYSTEM AND METHOD FOR PERFORMING RESOURCE ALLOCATION FOR A HOST COMPUTER CLUSTER

(71) Applicant: VMware, Inc., Palo Alto, CA (US)

(72) Inventors: Ganesha Shanmuganathan, Mountain View, CA (US); Guoqiang Shu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 14/169,042

(22) Filed: Jan. 30, 2014

(65) Prior Publication Data

US 2015/0212856 A1    Jul. 30, 2015

(51) Int. Cl.
*G06F 15/173* (2006.01)
*G06F 9/50* (2006.01)

(52) U.S. Cl.
CPC ............ *G06F 9/5077* (2013.01); *G06F 9/5027* (2013.01); *G06F 2209/505* (2013.01)

(58) Field of Classification Search
None
See application file for complete search history.

(56) References Cited

U.S. PATENT DOCUMENTS

2010/0333092 A1* 12/2010 Stefansson .......... G06F 9/44505
                                                          718/100

* cited by examiner

*Primary Examiner* — Brian P Whipple

(57) ABSTRACT

A system and method for performing resource allocation for a host computer cluster uses a copy of a cluster resource allocation hierarchy of the host computer cluster to generate a host resource allocation hierarchy of a host computer in the host computer cluster.

30 Claims, 10 Drawing Sheets

SYSTEM AND METHOD FOR PERFORMING RESOURCE ALLOCATION FOR A HOST COMPUTER CLUSTER

BACKGROUND

Resource allocation techniques for distributed computer systems with resource-consuming clients, such as virtual machines (VMs), are important to ensure that the clients are operating at desired or target levels. For example, if a VM is powered on a host computer or migrated to a host computer, a resource allocation element need to generate resource allocation settings of the VM such that appropriate resources can be assigned to the VM.

Conventional resource allocation techniques for powering on or migrating VMs in a host computer cluster involve taking a resource allocation snapshot of the entire host computer cluster, which is then used to generate resource allocation settings for the VMs being powered on or migrated. However, these conventional resource allocation techniques require that the resource allocation snapshot be operated on for each host computer involved in the powering on or migrating of the VMs in a serial fashion, which reduces the scalability of the resource allocation techniques.

SUMMARY

A system and method for performing resource allocation for a host computer cluster uses a copy of a cluster resource allocation hierarchy of the host computer cluster to generate a host resource allocation hierarchy of a host computer in the host computer cluster.

A method for performing resource allocation for a host computer cluster in accordance with an embodiment of the invention comprises obtaining a copy of a cluster resource allocation hierarchy of the host computer cluster and generating a host resource allocation hierarchy of a host computer in the host computer cluster based on the copy of the cluster resource allocation hierarchy. In some embodiments, the steps of this method are performed when program instructions contained in a computer-readable storage medium is executed by one or more processors.

A computer system for performing resource allocation for a host computer cluster in accordance with an embodiment of the invention comprises a processor and a resource allocation module operably connected to the processor. The resource allocation module is configured to obtain a copy of a cluster resource allocation hierarchy of the host computer cluster and generate a host resource allocation hierarchy of a host computer in the host computer cluster based on the copy of the cluster resource allocation hierarchy.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
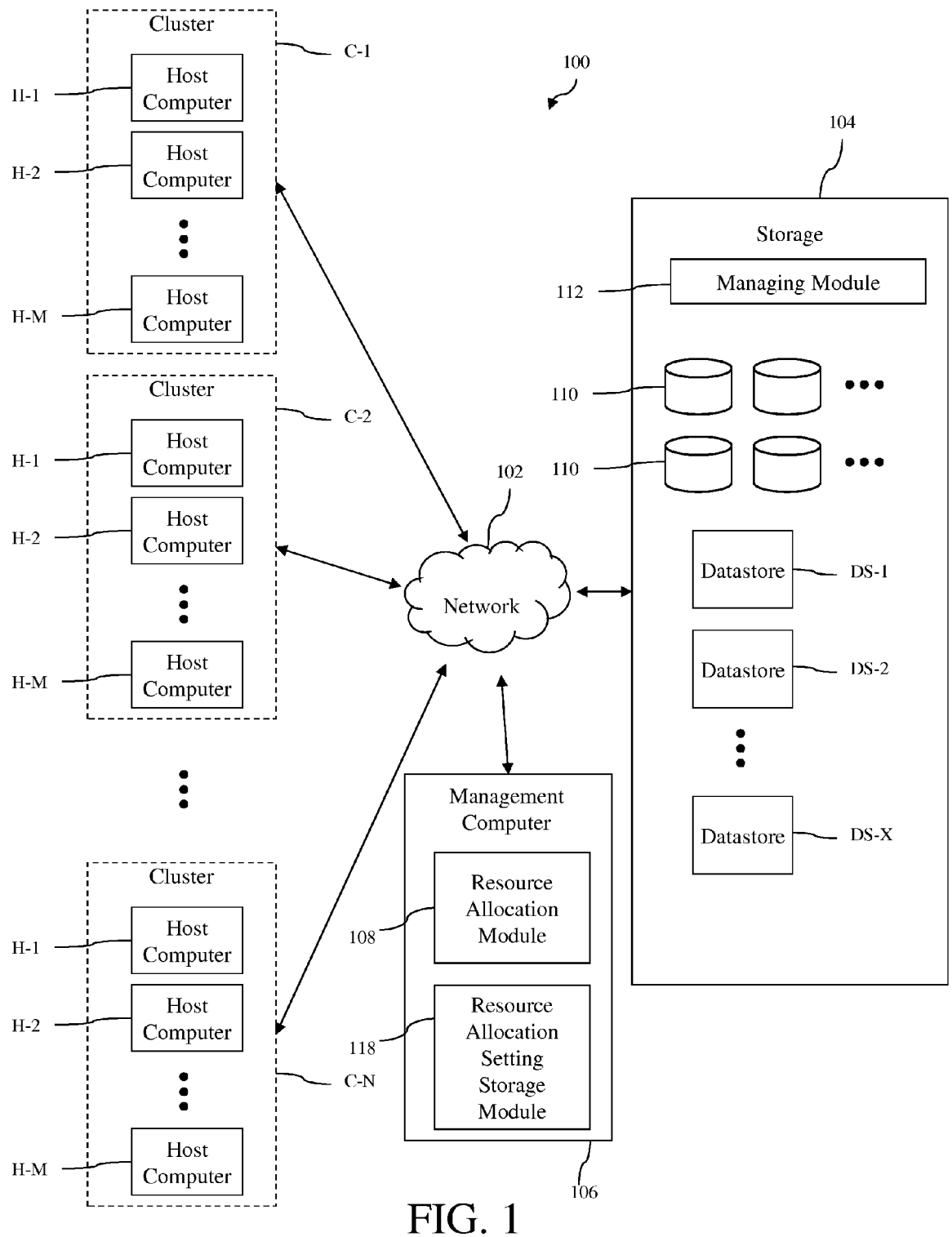
FIG. 1 is a block diagram of a distributed computer system in accordance with an embodiment of the invention.

Turning now to FIG. 1, a distributed computer system 100 in accordance with an embodiment of the invention is shown. The distributed computer system may be, for example, a computer network system. As shown in FIG. 1, the distributed computer system includes a network 102, clusters C-1, C-2 . . . C-N of host computers (where N is a positive integer), storage 104 and a management computer 106 with a resource allocation module 108 and a resource allocation setting storage module 118. The exact number of host computer clusters included in the distributed computer system can be any number of clusters from one to tens of clusters or more. The host computers of the different clusters, the storage and the management computer are connected to the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
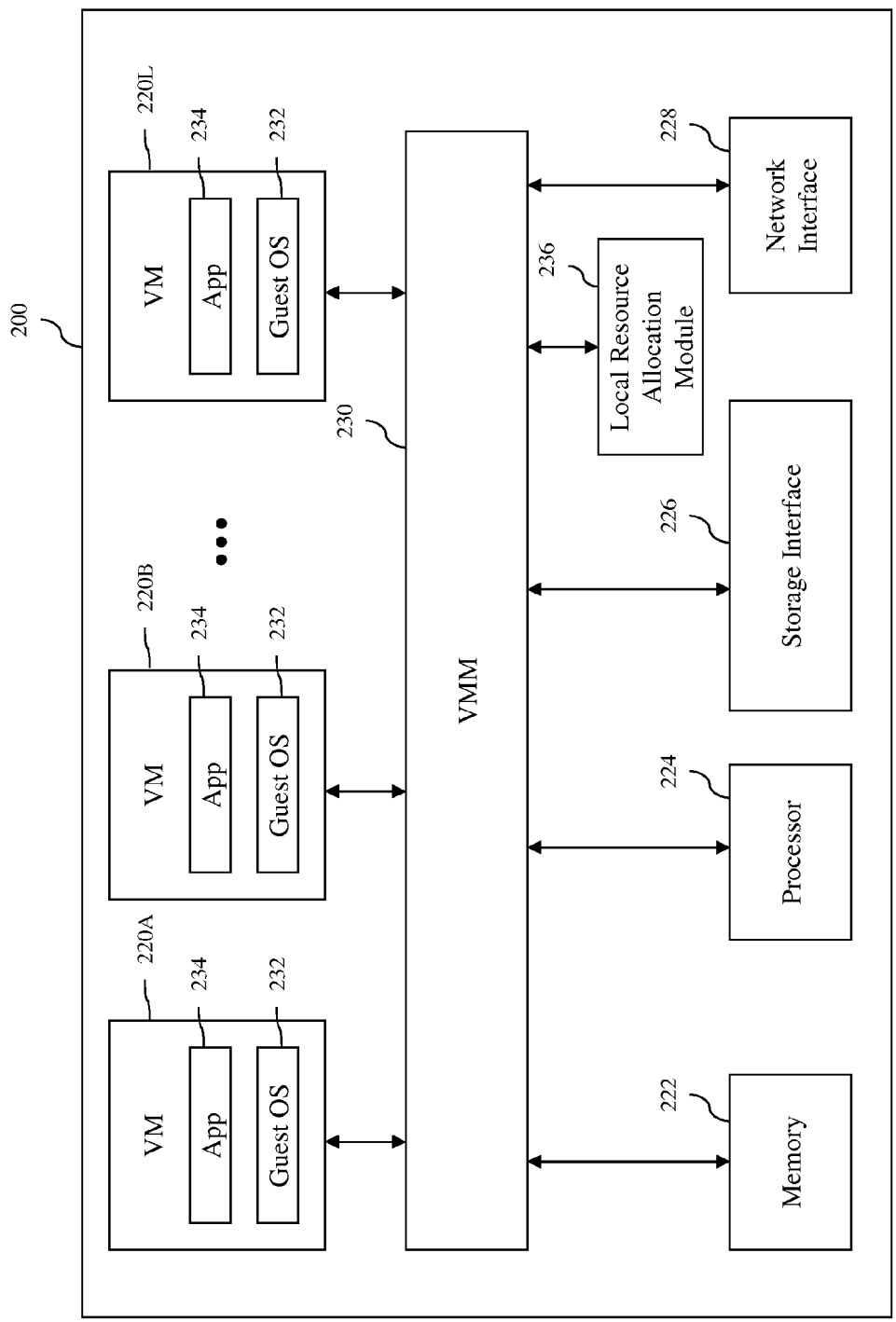
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one thousand. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system (OS) 232 and one or more guest applications (APP) 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local resource allocation module 236 that operates as part of a resource management system, such as a distributed resource scheduler system, to manage resources consumed by the VMs 220A, 220B . . . 220L. The local resource allocation module in each host computer cooperatively operates with the local resource allocation modules in the other host computers of the network computer system 100 to generate resource allocation settings and perform resource scheduling, which includes balancing the loads of software processes and/or storage resource scheduling, among the host computers H-1, H-2 . . . H-M of the host computer clusters C-1, C-2 . . . C-N. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on the host computer. However, in other embodiments, the local resource allocation module may be implemented using any combination of software and hardware.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the clusters C-1, C-2 . . . C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management computer 106 operates to manage the host computers H-1, H-2 . . . H-M of the clusters C-1, C-2 . . . C-N and/or the storage 104 of the distributed computer system 100. The management computer may be configured to generate, modify and/or monitor the current configurations of the host computers and the clients running on the host computers, for example, virtual machines (VMs). The configurations may include hardware configuration of each of the host computers, such as CPU type and memory size, and/or software configurations of each of the host computers, such as operating system (OS) type and installed applications or software programs. The configurations may also include clustering information, i.e., which host computers are included in which clusters. The configurations may also include client hosting information, i.e., which clients, e.g., VMs, are hosted or running on which host computers. The configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients. In an embodiment, the management computer 106 may also be configured to generate, modify and/or monitor the current configuration of the storage 104, including the physical storage devices 110 and the datastores DS-1, DS-2 . . . DS-X of the storage.

In an embodiment, the management computer 106 may also be configured to perform various operations to manage the clients, the host computers H-1, H-2 . . . H-M, the clusters C-1, C-2 . . . C-N of host computers and the storage 104. As an example, the management computer may be configured to initially place new clients onto one or more of the host computers in particular clusters and move existing clients to different host computers and/or different clusters. The management computer can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM can be migrated from one host computer cluster to another, in a process that is known as live VM migration. As another example, the management computer may be configured to power down particular clients and/or host computers to conserve power. In order to perform these various operations, the management computer (e.g., the resource allocation module 108) may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management computer may be configured or programmed to perform other operations to manage the distributed computer system 100. In an implementation, the management computer is a VMware vCenter™ server with at least some of the features available for such server.

In one embodiment, the resource allocation module 108 may be periodically activated, i.e., called to run, at predefined intervals, for example, every five minutes. In addition, the resource allocation module may be activated at will when certain events or conditions occur. For example, the resource allocation module may be activated when one of the host computers is shut down for maintenance or a new VM is created in the distributed computer system 100. Alternatively, the resource allocation module may be activated manually by a user of the management computer 106.

The resource allocation setting storage module 118 is configured to store the resource allocation settings of the distributed computer system 100. The resource allocation setting storage module can be an electronic, magnetic, optical, electromagnetic, infrared, or semiconductor system (or apparatus or device), or a propagation medium. Examples of the resource allocation setting storage module include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In some embodiments, the resource allocation setting storage module 118 is a memory module, e.g., a random access memory (RAM), a read-only memory (ROM), or any other suitable memory, that can be used to store a cluster resource allocation hierarchy for a host computer cluster. As used herein, a cluster resource allocation hierarchy includes a hierarchical organization/relationship of one or more resource nodes (e.g., host computer cluster, resource pools, software clients) present in a host computer cluster and resource allocation settings (e.g., limits, reservations, shares) of the resource nodes. In one embodiment, the resource allocation setting storage module 118 includes a cache component that caches a cluster resource allocation hierarchy for a host computer cluster. For example, the resource allocation setting storage module 118 may include a computer cache that transparently stores a cluster resource allocation hierarchy for a host computer cluster so that future requests for the cluster resource allocation hierarchy can be served faster.

In one embodiment, the resource allocation setting storage module 118 stores a cluster resource allocation hierarchy of a host computer cluster. The resource allocation module 108 obtains a copy of the cluster resource allocation hierarchy and generates a host resource allocation hierarchy of a host computer in the host computer cluster based on the copy of the cluster resource allocation hierarchy. As used herein, a host resource allocation hierarchy includes a hierarchical organization/relationship of one or more resource nodes (e.g., host computer, resource pools, software clients) present in a host computer and resource allocation settings (e.g., limits, reservations, shares) of the resource nodes. The resource allocation module 108 can generate a second host resource allocation hierarchy of a second host computer in the host computer cluster based on a second copy of the cluster resource allocation hierarchy while the host resource allocation hierarchy is being generated. Compared to a conventional resource allocation technique that directly manipulates a cluster resource allocation hierarchy of a host computer cluster to serially generate host resource allocation hierarchies of host computers in the host computer cluster, the resource allocation module 108 operates on one or more copies of the cluster resource allocation hierarchy. Consequently, the resource allocation module 108 can simultaneously generate multiple host resource allocation hierarchies for different host computers and reduce the time for generating host resource allocation settings. Because the time for generating host resource allocation settings is reduced, the time taken by the power-on of clients (e.g., VMs) on host computers and migration of clients to host computers is reduced.

In one embodiment, the resource allocation module 108 generates a host resource allocation hierarchy of a host computer in a host computer cluster by removing, from a copy of a cluster resource allocation hierarchy stored in the resource allocation setting storage module 118, every resource allocation item that is not present on the host computer. For example, the resource allocation module 108 can remove, from the copy of the stored cluster resource allocation hierarchy, every client that is not hosted on the host computer and every resource pool node that does not include any client that is hosted on the host computer.

In one embodiment, the resource allocation module 108 generates a host resource allocation hierarchy of a host computer in a host computer cluster by obtaining resource allocation settings of a client (e.g., a VM) located at the bottom layer of the cluster resource allocation hierarchy and subsequently, obtaining resource allocation settings of each parent of the client in the resource hierarchy.

In one embodiment, the resource allocation module 108 generates a host resource allocation hierarchy of a host computer in a host computer cluster by generating resource allocation settings of a resource pool node based on resource allocation settings of a client (e.g., a VM), which is a child node of the resource pool node and is hosted on the host computer. Because the resource pool node is the parent node of the client in the host resource allocation hierarchy, the resource allocation settings of the resource pool node are greater than the resource allocation settings of the client.

In one embodiment, the resource allocation module 108 generates a host resource allocation hierarchy of a host computer in a host computer cluster by generating resource allocation settings of a resource pool node based on resource allocation settings of multiple clients (e.g., VMs) that are child nodes of the resource pool node. The clients include at least a first client that is hosted on the host computer and a second client that is not hosted on the host computer. The resource allocation module 108 may generate the resource allocation settings of the resource pool node based on a ratio between the resource allocation settings of the first client and the corresponding resource allocation settings of the second client and/or demands of the first client and the second client.

The removing of a resource allocation item that is not presented on a host computer from a copy of a cluster resource allocation hierarchy and the generation resource allocation settings of a resource pool node on the host computer can be performed in parallel to each other. Consequently, the time for generating host resource allocation settings can be further reduced. In some embodiments, the cluster resource allocation hierarchy, the client to host computer mapping, and/or resource settings of resource pool nodes on individual host computers can be stored or cached in the resource allocation setting storage module 118. By accessing the cached cluster resource allocation hierarchy, the cached client to host computer mapping, and/or cached resource settings of resource pool nodes, the resource allocation module 108 can reduce the completion time for the generation or the modification host resource allocation hierarchies of host computers. Consequently, the time for powering-on clients (e.g., VMs) on host computers or migrating clients between host computers can be further reduced.

In one embodiment, the resource allocation module 108 modifies the host resource allocation hierarchy of a host computer to include a client (e.g., a VM) that is being powered on the host computer or being migrated to the host computer. If a client is being migrated to the host computer, the resource allocation module 108 can generate resource allocation settings of the client by copying resource allocation settings of the client in the cluster resource allocation hierarchy and modify the host resource allocation hierarchy of the host computer to include the client and the generated resource allocation settings of the client. If a client is being powered on the host computer, the resource allocation module 108 can generate resource allocation settings of the client based on a resource allocation settings of a similar client in the stored cluster resource allocation hierarchy and modify the host resource allocation hierarchy of the host computer to include the client and the generated resource allocation settings of the client.

Figure 3:
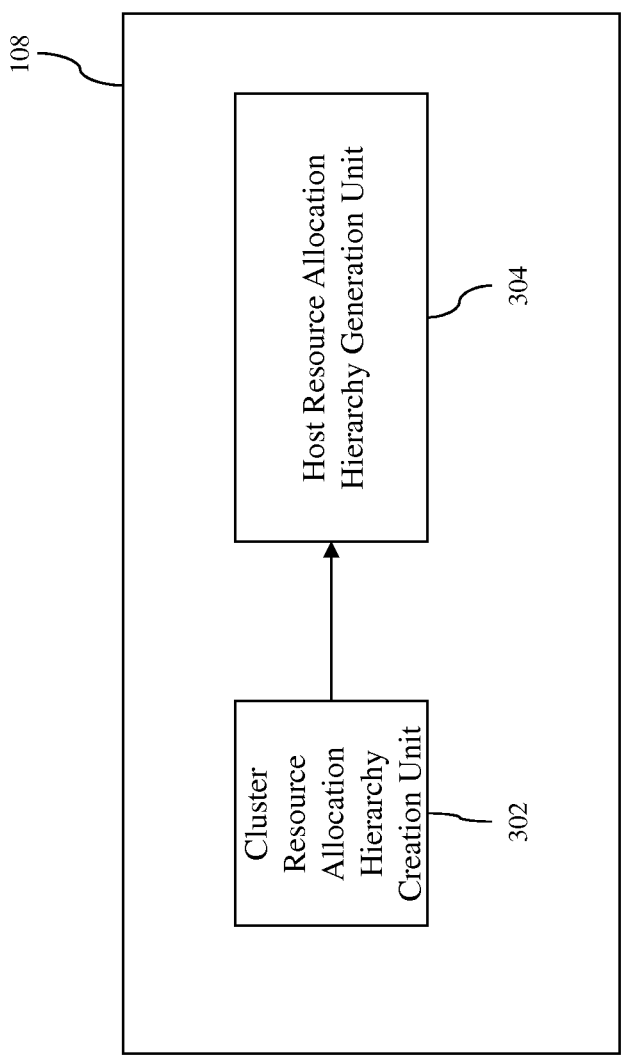
FIG. 3 is a block diagram of a resource allocation module included in a management computer of the distributed computer system in accordance with an embodiment of the invention.

Turning now to FIG. 3, a block diagram of components of the resource allocation module 108 in the management computer 106 in accordance with an embodiment of the invention is shown. As illustrated in FIG. 3, the resource allocation module 108 includes a cluster resource allocation hierarchy creation unit 302 and a host resource allocation hierarchy generation unit 304. These components of the resource allocation module can be implemented as software, hardware or a combination of software and hardware. In other embodiments, the resource allocation module may include other components found in conventional resource allocation modules. In a particular implementation, the resource allocation module is a distributed resource scheduler (DRS) installed in a VMware vCenter™ server that is executed by one or more processors of the server. However, in other embodiments, the resource allocation module may be installed in any other computer system.

Resources allocated to clients (e.g., VMs), host computers, or resource pools (RPs) can be controlled by adjusting resource allocation/control settings, which may include reservation, limit and shares parameters. In one embodiment, a reservation is the minimum amount of physical resources guaranteed to be available to a VM, a host computer, or an RP even when the resources in a host computer cluster or a distributed computer system are over-committed. A reservation can be expressed in absolute units, e.g., MHz for CPU reservations and MB for memory reservations. In one embodiment, a limit specifies the upper bound of the resources that can be allocated to a VM, a host computer, or an RP. In one embodiment, a limit is honored even when there are idle resources. As with reservations, limits can be specified in absolute units, e.g., MHz for CPU limits and MB for memory limits. In one embodiment, shares specify the relative priority of a VM, a host computer, or an RP in a host computer cluster. Shares are sometimes also referred to as weights. Unlike reservations and limits, shares can be specified in relative terms. The shares values assigned to VMs, host computers, or RPs can be used to determine how the excess resources are divided among the VMs, host computers, and RPs when there is contention in the distributed computer system 100. The resource allocation/control settings for reservation, limit and shares are also referred to as RLS settings. In addition to the RLS settings, each resource allocated to a VM, a host computer, or an RP may have a size parameter. In one embodiment, the size parameter of CPU may be the number of virtual CPU (vCPUs) allocated for a VM and the size parameter of memory may be the size of the memory advertised to the guest operating system (OS) of a VM.

The cluster resource allocation hierarchy creation unit 302 operates to create a cluster resource allocation hierarchy for a host computer cluster C-1, C-2 . . . or C-N of the distributed computer system 100. The generated cluster resource allocation hierarchy can be stored at, for example, the resource allocation setting storage module 118. In an embodiment, the aggregated resources of a host computer cluster can be partitioned in a hierarchical fashion using a resource pool (RP) abstraction. Partitioning the resources using the RP abstraction allows service providers (e.g., cloud providers) to group related clients (e.g., VMs) and provide performance isolation among resource groups. For example, resources in a company can be grouped in a resource cluster and each department in the company can be assigned its own resource pool in order to guarantee that one department does not consume all the resources available in the resource cluster. In one embodiment, a hierarchical organization of a virtualized computing environment shows entities of the distributed computer system 100 that are divided into different layers. For example, a hierarchical organization may show host computer clusters, host computers, software clients (e.g., VMs) of the distributed computer system 100 that are divided into a root layer and one or more underlying layers. In an embodiment, a host computer cluster is at the root of the hierarchy. The resources in the host computer cluster are shared by host computers that are included in the host computer cluster, which are located in a first layer that is directly underneath the root of the hierarchy. The resources in a particular host computer are shared by software clients (e.g., VMs) hosted in the particular host computer, which are located in a second layer that is underneath the first layer.

In one embodiment, the cluster resource allocation hierarchy creation unit 302 takes a snapshot of user specified resource requirements along with the current memory and CPU demands of clients (e.g., VMs) to generate a cluster resource allocation hierarchy for a host computer cluster C-1, C-2 . . . or C-N. In some embodiments, the cluster resource allocation hierarchy is presented in a tree-like structure. The cluster resource allocation hierarchy may be associated with time information such as a time stamp or a generation number. In some embodiments, the resource allocation module 108 is the only entity creating the cluster resource allocation hierarchy of a host computer cluster. In these embodiments, the resource allocation hierarchy can be generated in a lock-free manner by using read-copy-update. In some embodiments, the resource allocation module uses a single thread to create the cluster resource allocation hierarchy of a host computer cluster. For example, the resource allocation module creates a mutual exclusion object (mutex) and locks the mutex from other threads while using a single thread to create the cluster resource allocation hierarchy of a host computer cluster. After a client (VM) is powered on or its resource setting edited, the resource allocation module is scheduled to run after a predefined time period (e.g., 30 seconds or any other suitable time period) to update the cluster resource allocation hierarchy of a host computer cluster.

The host resource allocation hierarchy generation unit 304 operates to generate host-specific allocation hierarchy based on a copy of a cluster resource allocation hierarchy of a host computer cluster that is generated by the cluster resource allocation hierarchy creation unit 302. The host resource allocation hierarchy generation unit can fetch a copy of a cluster resource allocation hierarchy of a host computer cluster from the resource allocation setting storage module 118. In an embodiment, the host resource allocation hierarchy generation unit generates a host resource allocation hierarchy for each host computer that mirrors/reflects on host resource settings of the host computer. The host resource allocation hierarchy generation unit can simultaneously generate host resource allocation hierarchies for multiple host computers. In some embodiments, the host resource allocation hierarchy generation unit generates a host resource allocation hierarchy for a host computer by making a copy of a cluster resource allocation hierarchy of a host computer cluster and removing/pruning out all the entities, which may be clients (e.g., VMs) or resource pool nodes that do not exist on the host computer. Once the copy of the resource allocation hierarchy has only client (e.g., a VM) or clients existing on the host computer and all the resource pools, the host resource allocation hierarchy generation unit can also prune out the empty resource pools (RPs). Next, the host resource allocation hierarchy generation unit performs a bottom-up pass on the copy of the resource allocation hierarchy to generate the reservation, limit and share values for the resource pools. In one embodiment, the host resource allocation hierarchy generation unit sums up the divvyed/divided/split reservation and limit values at each resource pool from the bottom most leaves. Subsequently, the host resource allocation hierarchy generation unit sums up the divvyed reservation and limit values of children of a higher up resource pool and so on. During the bottom-up pass, if all the children resource pools of a parent resource pool are empty and the parent resource pool also does not have any client, the host resource allocation hierarchy generation unit marks the parent resource pool empty and pruned out the parent resource pool from the copy of the resource allocation hierarchy. The host resource allocation hierarchy generation unit can calculate share values in the bottom-up pass by summing up all the children shares on the current copy of the resource allocation hierarchy, dividing the summing result by the summing result of the children values of the resource allocation hierarchy, and multiply the division result by the user-set share value of the resource allocation hierarchy. Once the host resource allocation hierarchy generation unit generates a host resource allocation hierarchy for a host computer, the host resource allocation hierarchy generation unit pushes the host resource allocation hierarchy to the host computer.

The bottom-up pass on the host resource allocation hierarchies can be triggered whenever the resource allocation hierarchy of the distributed computer system 100 is updated.

Turning back to FIG. 1, in one embodiment, the resource allocation module 108 performs resource allocation for the distributed computer system 100 by issuing two different application calls. The resource allocation module issues a periodic action call to perform load balancing, power management and fix constraint violations in the distributed computer system. Additionally, the resource allocation module issues a resource allocation call to perform resource allocation for powering on/off and/or migrating/moving clients (e.g., VMs) between host computers in the distributed computer system.

In an exemplary VM power-on process on a particular host computer, the management computer 106 performs the cluster level admission check on user inputted resource settings. Once the admission check is completed, the resource allocation module 108 sets the VMs divvyed reservation value to the user set reservation plus system overhead and set the divvyed/divided/split limit value to zero. Subsequently, the resource allocation module adds the VM to the host resource allocation hierarchy of the particular host computer and performs a bottom-up pass on the host resource allocation hierarchy of the particular host computer to update its values. The resource allocation module pushes the updated host resource allocation hierarchy onto the host computer on which the VM is powered on. During the powering on of the VM, the on-host values may not be completely accurate. After the VM is powered up in the host, the resource allocation module generates accurate divvyed resource allocation settings and updates the host resource allocation hierarchy at the particular host computer asynchronously.

In an exemplary VM migration process from a source host computer to a destination host computer, the resource allocation module 108 updates host resource allocation hierarchies of the source host computer and the destination host computer. Before the VM is migrated, the resource allocation module adds the VM to the host resource allocation hierarchy of the destination host computer and performs a bottom-up pass on the host resource allocation hierarchy of the destination host computer to update the resource allocation settings. The resource allocation module pushes the updated host resource allocation hierarchy to the destination host computer before the VM is migrated. After the VM is migrated, the resource allocation module removes the VM from the host resource allocation hierarchy of the source host computer and performs a bottom-up pass on the host resource allocation hierarchy of the source host computer to update the resource allocation settings. The resource allocation module pushes the updated host resource allocation hierarchy onto the source host computer after the VM is migrated. Because the resource allocation hierarchy of the distributed computer system 100 has the right divvyed values for the migrating VM, there is no need to schedule a resource allocation call after adding or removing a VM to a host allocation tree.

Figure 4:
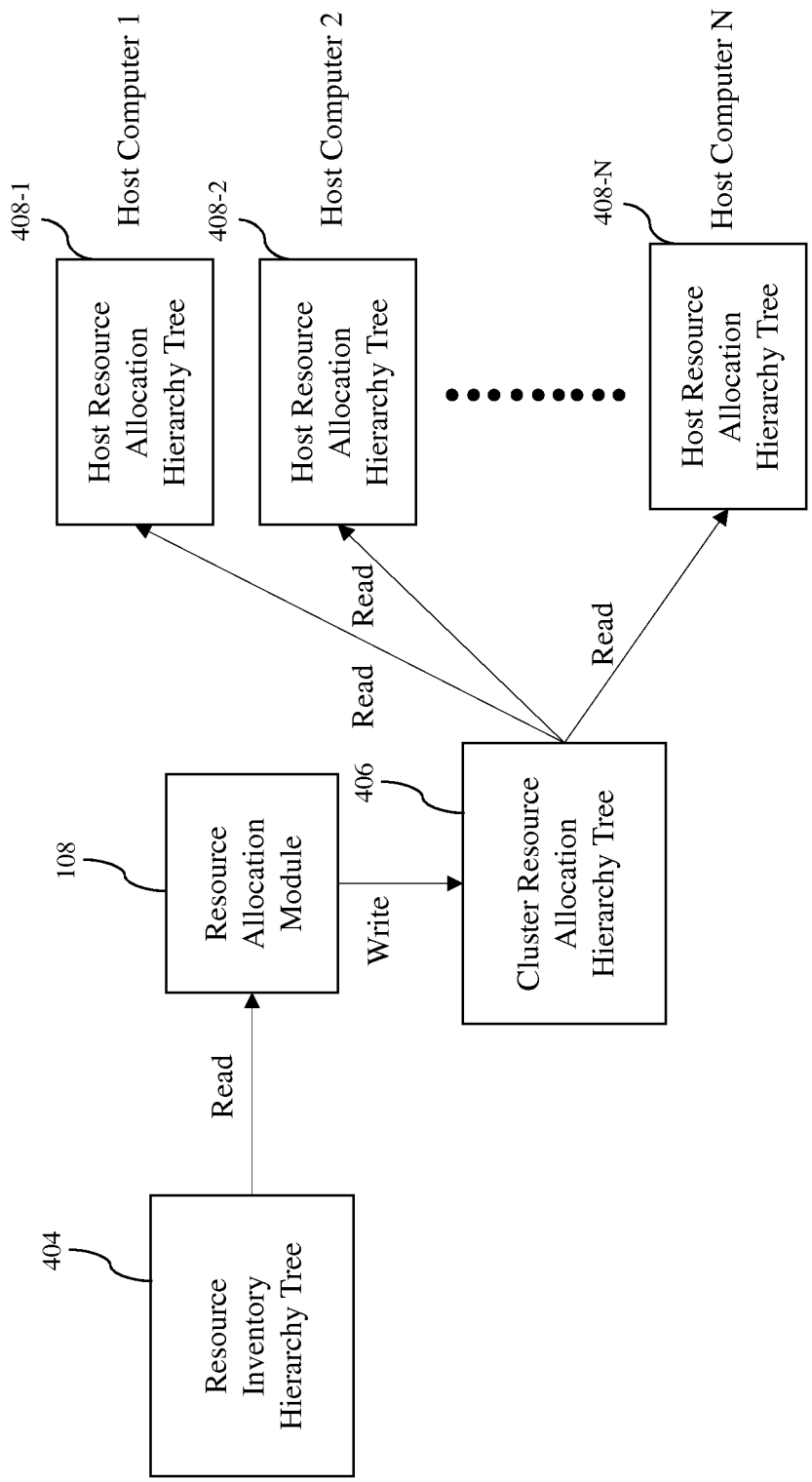
FIG. 4 depicts an organization of resource allocation hierarchies in the distributed computer system, according to one embodiment of the invention.

FIG. 4 depicts an organization of resource allocation hierarchies in the distributed computer system 100, according to one embodiment of the invention. In the embodiment depicted in FIG. 4, clients (e.g., VMs) are powered on host computers 1, 2 . . . N (where N is a positive integer). As illustrated in FIG. 4, a resource inventory hierarchy 404, which can be presented in a tree structure, is generated by user set resource parameters (e.g., reservation, limit, share values). In one embodiment, an admission check may be performed on the resource inventory hierarchy by the management computer 106 or another authentication/authorization device.

Once the admission check is completed, a resource management hierarchy, which can be presented in a tree structure, may be generated. The resource management hierarchy may be identical with the resource inventory hierarchy. The resource allocation module 108 reads the resource inventory hierarchy tree and generates a cluster resource allocation hierarchy 406, which can be presented in a tree structure. The generated cluster resource allocation hierarchy 406 can be stored/cached in the resource allocation setting storage module 118. The resource allocation module 108 simultaneously creates multiple host resource allocation hierarchies 408-1, 408-2 . . . 408-N, for host computers 1,2 . . . N to add the clients being powered on based on the cluster resource allocation hierarchy 406. For example, the resource allocation module 108 obtains/makes multiple copies of the cluster resource allocation hierarchy and makes host computer specific changes to the copies of the cluster resource allocation hierarchy in parallel with each other. The host resource allocation hierarchies are transmitted to corresponding host computers on which the clients are powered.

Figure 5:
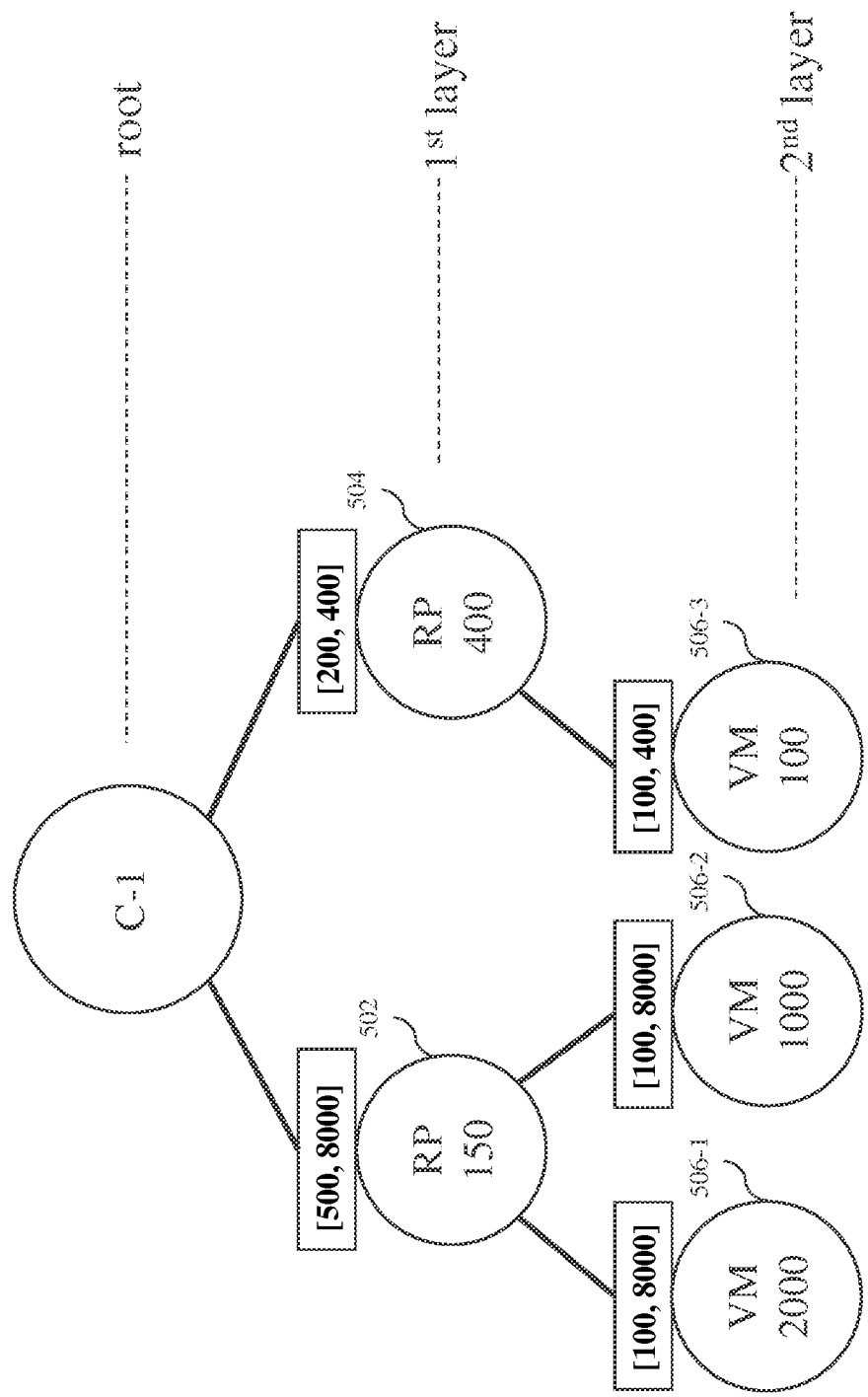
FIG. 5 depicts a cluster-level hierarchical organization of a virtualized computing environment, according to one embodiment of the invention.

FIGS. 5-9 illustrate some examples of cluster-level resource allocation hierarchies and host-specific resource allocation hierarchies of the distributed computer system 100. Specifically, FIG. 5 depicts a cluster-level hierarchical organization of a virtualized computing environment, according to one embodiment of the invention. As illustrated in FIG. 5, a host computer cluster/resource cluster C-1 is at the root of the hierarchy. The host computer cluster C-1 includes hierarchical organized RPs 502 and 504 and VMs 506-1, 506-2 and 506-3. In particular, the resources available in the host computer cluster C-1 are divided into the two RPs 502 and 504, which are located in a first layer that is directly underneath the resource cluster C-1. The resources in the RP 502 are shared by the VMs 506-1 and 506-2, which are located in a second layer that is underneath the first layer. The resources in the RP 504 are used by the VM 506-3, which is located in the second layer.

In the cluster-level hierarchical organization depicted in FIG. 5, resource allocation parameters of the RPs 502 and 504 and the VMs 506-1, 506-2 and 506-3 include reservations (R), limits (L) and shares (S). Reservations and limits are specified in absolute units, e.g., MHz for CPU limits and MB for memory limits. Shares are specified in relative units. As illustrated in FIG. 5, the RP 502 has a reservation value of 500 MHz/MB, a limit value of 8000 MHz/MB ([500, 8000]), and a share value of 150. The RP 504 has a reservation value of 200 MHz/MB, a limit value of 400 MHz/MB ([200, 400]), and a share value of 400. The RPs 502 and 504 share resources of the cluster C-1 in a ratio of 150:400. The VM 506-1 has a reservation value of 100 MHz/MB, a limit value of 8000 MHz/MB ([100, 8000]), and a share value of 2000. The VM 506-2 has a reservation value of 100 MHz/MB, a limit value of 8000 MHz/MB ([100, 8000]), and a share value of 1000. The VMs 506-1 and 506-2 share resources contained in the RP 502 in a ratio of 2:1 (2000:1000). The RP 502 divvies/divides/splits the resources in the ratio of 1:2 for the VM 506-1 and the VM 506-2. The VM 506-3 has a reservation value of 100 MHz/MB, a limit value of 400 MHz/MB ([100, 400]), and a share value of 100.

Figure 6:
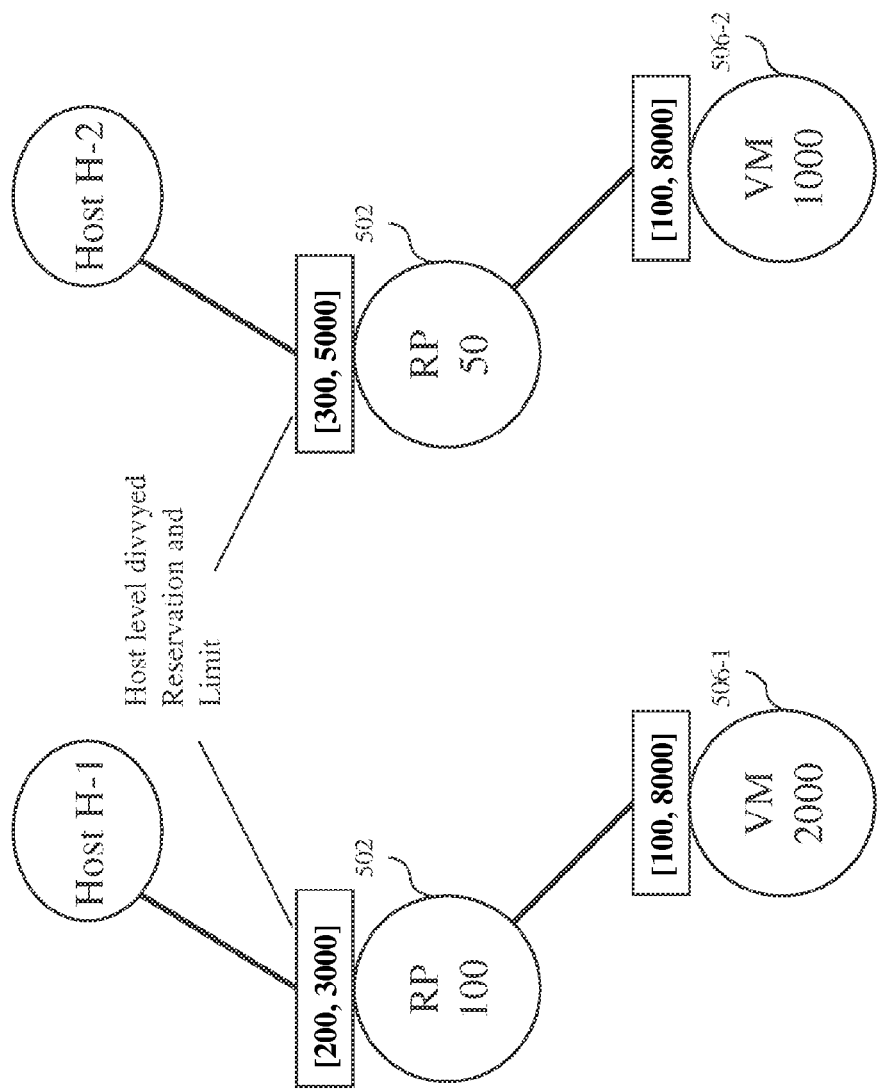
FIG. 6 depicts a host-level hierarchical organization of the cluster-level hierarchical organization depicted in FIG. 5.

FIG. 6 depicts a host-level hierarchical organization of the cluster-level hierarchical organization depicted in FIG. 5. The transformation from the cluster-level hierarchical organization to the host-level hierarchical organization can be performed in the resource allocation module 108 (e.g., by the host resource allocation hierarchy generation unit 304). As illustrated in FIG. 6, the cluster-level hierarchical organization is converted to the host-level hierarchical organization for host computers H-1, H-2. In the embodiment depicted in FIG. 6, the VMs 560-1 and 506-2 are hosted on the host computers H-1 and H-2, respectively. Because the VMs 506-1 and 506-2 are children nodes of the RP 502 and are hosted on different host computers, the resource allocation module 108 (e.g., the host resource allocation hierarchy generation unit 304) splits the RP 502 into two copies and creates the RP 502 on each host computer. As described with respect to FIG. 5, the VMs 506-1 and 506-2 share resources contained in the RP 502 in a ratio of 2:1. The shares of the RP 502 on the host computer H-1 is 100, which is equal to ⅔ of the shares (150) that the RP 502 has at the cluster level because the VM 506-1 obtains ⅔ of resources contained in the RP 502. The shares of the RP 502 on the host computer H-2 is 50, which is equal to ⅓ of the shares (150) that the RP 502 has at the cluster level because the VM 506-2 obtains ⅓ of resources contained in the RP 502. The resource allocation module 108 divvies/splits the reservation and limit of the RP 502 set at the cluster level for the host computers H-1, H-2. The resource allocation module 108 performs the divvying process based on the demands, reservations and limits of the children of the RP 502, which are the VMs 506-1 and 506-2. The RP 502 on the host computer H-1 has a reservation value of at least 100 because the reservation of its children node (VM 506-1) is 100. Similarly, the RP 502 on the host computer H-2 has a reservation value of at least 100. The resource allocation module 108 can assign reservation values to the RP 502 on the host computers H-1 and H-2 based on the ratio of shares of the RP 502 on the host computers H-1 and H-2. For example, the resource allocation module 108 can assign a greater reservation value to the RP 502 on the host computer H-1. However, in some embodiments, the resource allocation module 108 assigns reservation values to the RP 502 on the host computers H-1 and H-2 based on demands. In the embodiment depicted in FIG. 6, the reservation value of 500 of the RP 502 in cluster level is split into a reservation value of 200 for the RP 502 on the host computer H-1 and a reservation value of 300 for the RP 502 on the host computer H-2. The limit value of 8000 of the RP 502 in cluster level is split into a limit value of 3000 for the RP 502 on the host computer H-1 and a limit value of 5000 for the RP 502 on the host computer H-2.

Figure 7:
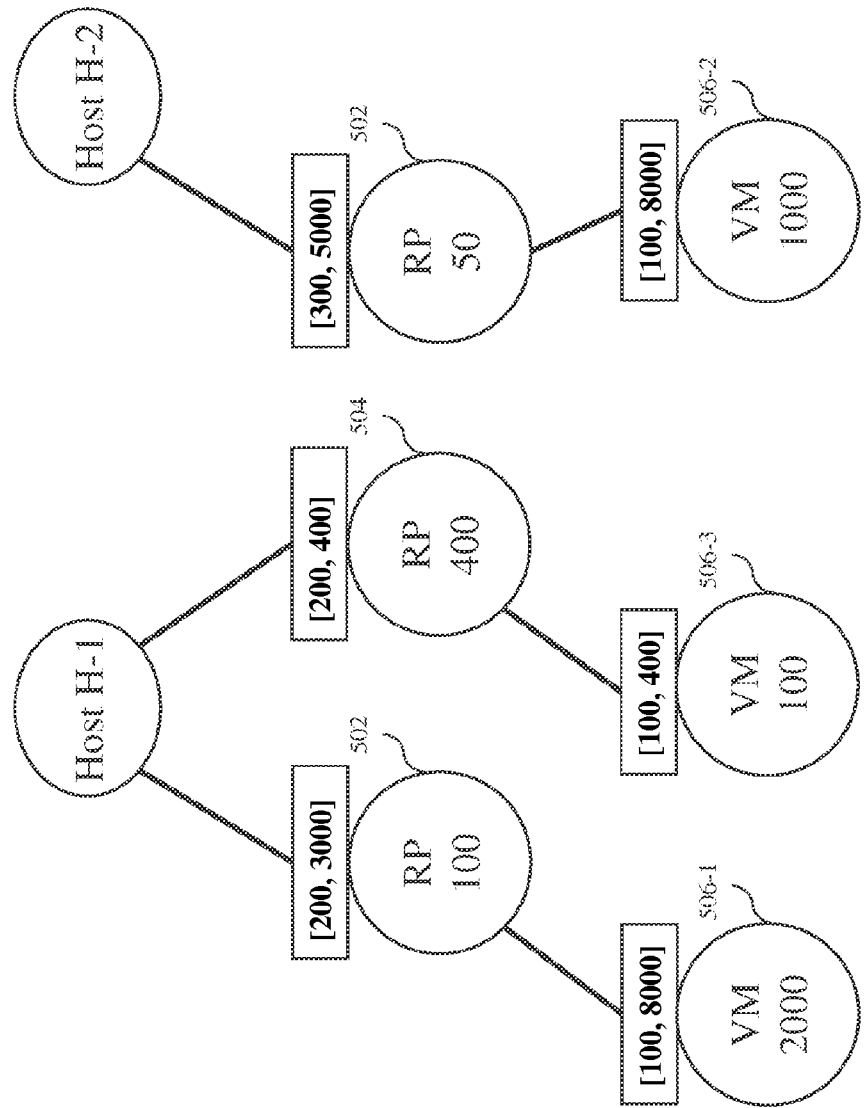
FIG. 7 depicts another host-level hierarchical organization of the cluster-level hierarchical organization depicted in FIG. 5.

FIG. 7 depicts another host-level hierarchical organization of the cluster-level hierarchical organization depicted in FIG. 5. The transformation from the cluster-level hierarchical organization to the host-level hierarchical organization can be performed in the resource allocation module 108 (e.g., in the host resource allocation hierarchy generation unit 304). The main difference between the host-level hierarchical organization depicted in FIG. 7 and the host-level hierarchical organization depicted in FIG. 6 is that the host-level hierarchical organization depicted in FIG. 7 shows the VM 506-3, which is hosted on the host computer H-1. The host computer H-2 does not have the RP 504 because the RP 504 does not have any relevant child node hosted in the host computer H-2. As illustrated in FIG. 7, reservations, limits, shares of the RP 504 on the host H-1 are the same as the same as reservations, limits, shares of the RP 504 of the cluster level.

After a client (e.g., a VM) is powered on or migrated to a host computer within a host computer cluster, the resource allocation module 108 (e.g., the host resource allocation hierarchy generation unit 304) updates the cluster-level allocation hierarchy of the host computer cluster and a corresponding host-specific allocation hierarchy of the host computer to add the client to the host computer cluster. The resource allocation module 108 can update the cluster-level allocation hierarchy of the host computer cluster before updating a host-specific allocation hierarchy of a host computer or after updating a host-specific allocation hierarchy of a host computer.

Figure 8:
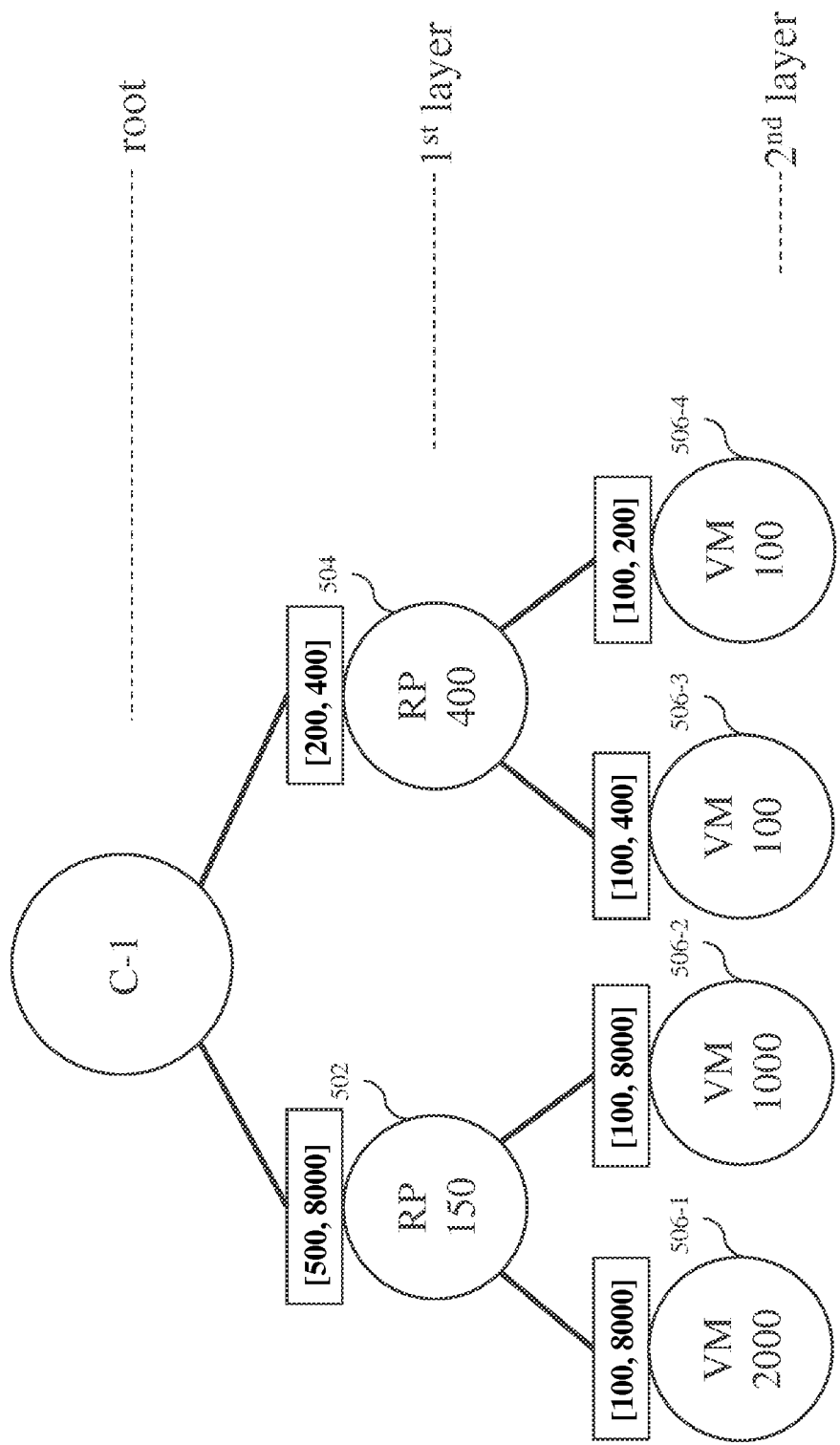
FIG. 8 depicts a cluster-level hierarchical organization of the virtualized computing environment after a VM is powered on in a host computer of a host computer cluster, according to one embodiment of the invention.

FIG. 8 depicts a cluster-level hierarchical organization of the virtualized computing environment after a VM 506-4 is powered on in a host computer of the host computer cluster C-1, according to one embodiment of the invention. The resource allocation module 108 (e.g., the cluster resource allocation hierarchy creation unit 302) can change/modify the cluster-level hierarchical organization depicted in FIG. 5 into the cluster-level hierarchical organization depicted in FIG. 8 to add the VM 506-4. The difference between the cluster-level hierarchical organization depicted in FIG. 8 and the cluster-level hierarchical organization depicted in FIG. 5 is that the cluster-level hierarchical organization in FIG. 8 shows the VM 506-4 as a child node of the RP 504. The resources in the RP 504 are shared by the VMs 506-3 and 506-4, which are located in the second layer. The resource allocation module 108 sets the resource allocation settings of the VM 506-4 to be similar/close to the resource allocation settings of its sibling node, the VM 506-3. As illustrated in FIG. 8, the VMs 506-3 and 506-4 share resources contained in the RP 504 in a ratio of 1:1 (100:100). The RP 504 divvies/divides/splits the resources in the ratio of 1:1 for the VM 506-3 and the VM 506-4. The VM 506-4 has a reservation value of 100 MHz/MB, a limit value of 200 MHz/MB ([100, 200]), and a share value of 100.

Figure 9:
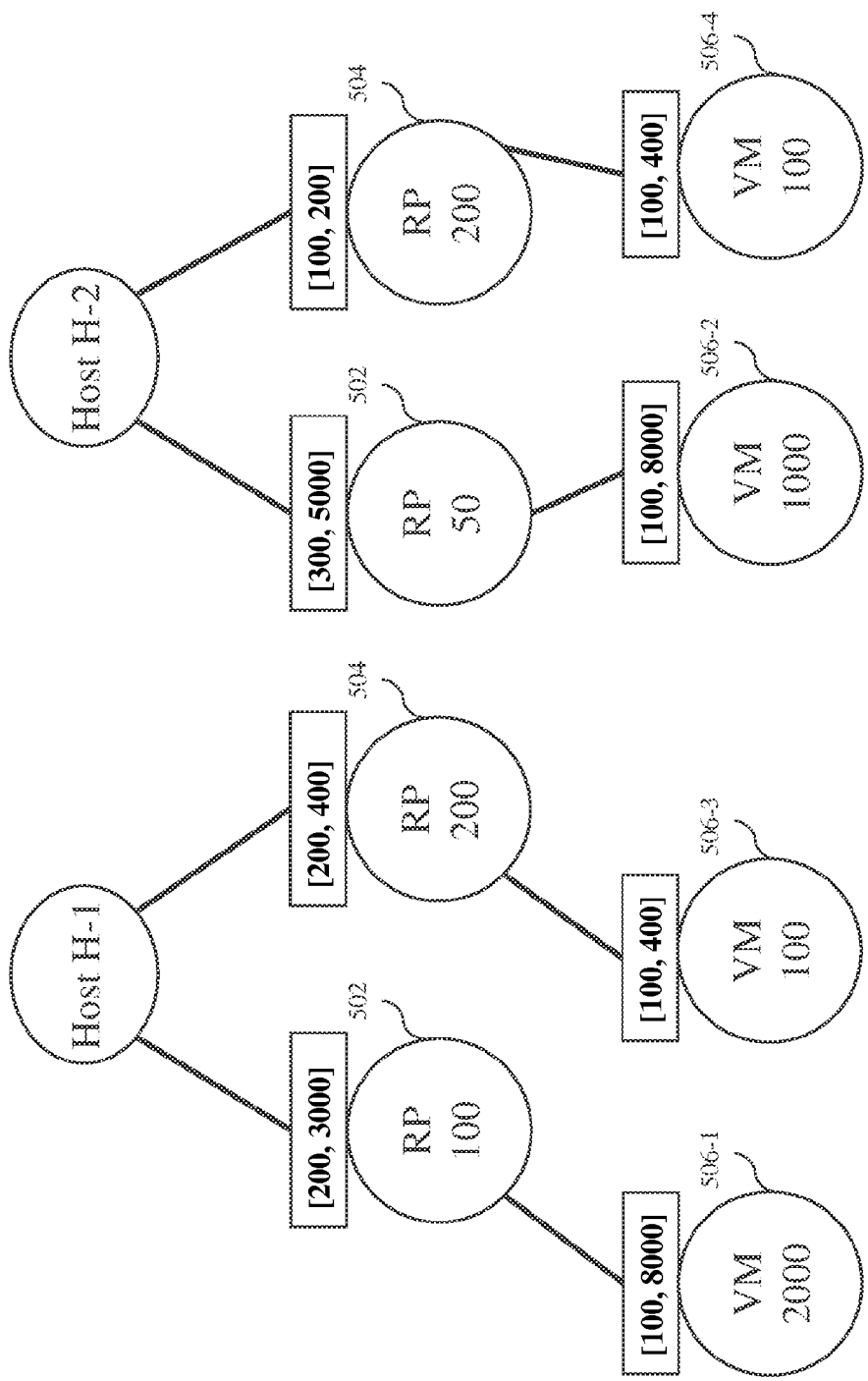
FIG. 9 depicts a host-level hierarchical organization of the cluster-level hierarchical organization depicted in FIG. 8.

FIG. 9 depicts a host-level hierarchical organization of the cluster-level hierarchical organization depicted in FIG. 8. The transformation from the cluster-level hierarchical organization to the host-level hierarchical organization can be performed in the resource allocation module 108 (e.g., by the host resource allocation hierarchy generation unit 304). The main difference between the host-level hierarchical organization depicted in FIG. 9 and the host-level hierarchical organization depicted in FIG. 7 is that the host-level hierarchical organization depicted in FIG. 9 shows the VM 506-4, which is being powered on the host computer H-2. As illustrated in FIG. 9, the VMs 506-3 and 506-4 are hosted on the host computer H-1 and the host computer H-2, respectively. Because the VMs 506-3 and 506-4 are children nodes of the RP 504 and are hosted on different host computers, the resource allocation module 108 (e.g., the host resource allocation hierarchy generation unit 304) divides/splits RP 504 into two copies and creates the RP 504 on each host computer. As described with respect to FIG. 8, the VMs 506-3 and 506-4 share resources contained in the RP 504 in a ratio of 1:1. The shares of the RP 504 on the host computer H-1 is 200, which is equal to ½ of the shares (400) that the RP 504 has at the cluster level because the VM 506-3 obtains ½ of resources contained in the RP 504. The shares of the RP 504 on the host computer H-2 is 200, which is equal to ½ of the shares (400) that the RP 504 has at the cluster level because the VM 506-4 obtains ½ of resources contained in the RP 504.

The resource allocation module 108 divvies/divides/splits the reservation and limit of the RP 504 set at the cluster level for the host computers H-1 and H-2. The resource allocation module 108 performs the divvying process based on the demands, reservations and/or limits of the children of the RP 504, which are the VMs 506-3 and 506-4. The RP 504 on the host computer H-1 has a reservation value of at least 100 because the reservation of its children node (VM 506-3) is 100. Similarly, the RP 504 on the host computer H-2 has a reservation value of at least 100. The resource allocation module 108 can assign reservation values to the RP 504 on the host computers H-1 and H-2 based on the ratio of shares of the RP 504 on the host computers H-1 and H-2. However, in some embodiments, the resource allocation module 108 assign reservation values to the RP 504 on the host computers H-1 and H-2 based on demands. In the embodiment depicted in FIG. 9, the host-level hierarchical organization has a reservation value of 200 for the RP 504 on the host computer H-1, a reservation value of 100 for the RP 504 on the host computer H-2, a limit value of 400 for the RP 504 on the host computer H-1 and a limit value of 200 for the RP 504 on the host computer H-2. After the VM 506-4 is powered on the host computer H-2, reservations and limits of the RP 504 on the host computer H-1 will be updated to [100, 200] after a predefined time period.

Figure 10:
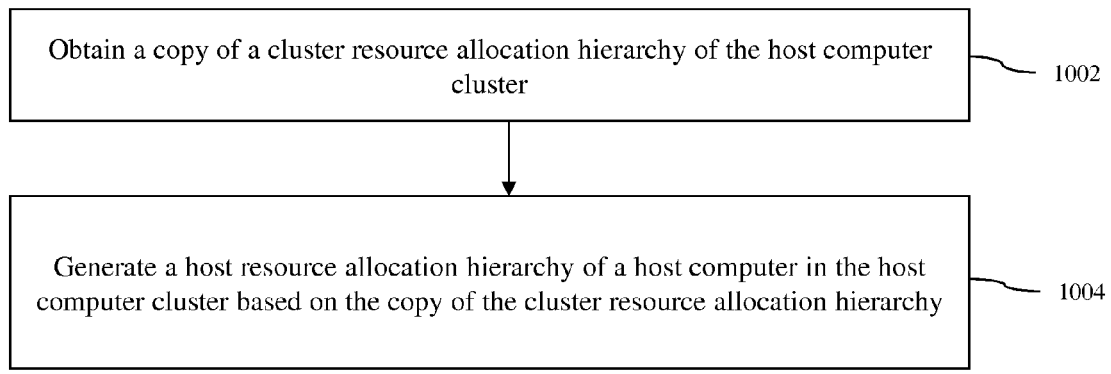
FIG. 10 is a flow diagram of a method for performing resource allocation for a host computer cluster in accordance with an embodiment of the invention.

A method for performing resource allocation for a host computer cluster in accordance with an embodiment of the invention is described with reference to a flow diagram of FIG. 10. At block 1002, a copy of a cluster resource allocation hierarchy of the host computer cluster is obtained. At block 1004, a host resource allocation hierarchy of a host computer in the host computer cluster is generated based on a copy of the cluster resource allocation hierarchy.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource allocation for a host computer cluster, the method comprising:
    obtaining a copy of a cluster resource allocation hierarchy of the host computer cluster; and
    generating a host resource allocation hierarchy of a host computer in the host computer cluster based on the copy of the cluster resource allocation hierarchy, the host resource allocation hierarchy including a hierarchical relationship of resource nodes associated with the host computer and resource allocation settings of the resource nodes,
    wherein at least one of obtaining the copy of the cluster resource allocation hierarchy of the host computer cluster and generating the host resource allocation hierarchy of the host computer in the host computer cluster based on the copy of the cluster resource allocation hierarchy is performed by a processor.

2. The method of claim 1, further comprising:
    obtaining a second copy of the cluster resource allocation hierarchy of the host computer cluster; and
    generating a second host resource allocation hierarchy of a second host computer in the host computer cluster based on the second copy of the cluster resource allocation hierarchy while the host resource allocation hierarchy is being generated.

3. The method of claim 1, wherein generating the host resource allocation hierarchy comprises:
    removing, from the copy of the cluster resource allocation hierarchy, every resource allocation item that is not presented on the host computer.

4. The method of claim 3, wherein removing, from the copy of the cluster resource allocation hierarchy, every resource allocation item that is not presented on the host computer comprises removing, from the copy of the cluster resource allocation hierarchy, every client that is not hosted on the host computer and every resource pool node that does not include any client that is hosted on the host computer.

5. The method of claim 1, wherein generating the host resource allocation hierarchy comprises:
    removing, from the copy of the cluster resource allocation hierarchy, every virtual machine that is not running on the host computer and every resource pool node that does not include any virtual machine that is running on the host computer.

6. The method of claim 1, wherein generating the host resource allocation hierarchy comprises:
    obtaining a resource allocation setting of a client located at the bottom layer of the cluster resource allocation hierarchy; and
    subsequently, obtaining a resource allocation setting of each parent of the client in the resource hierarchy.

7. The method of claim 6, wherein the client includes a virtual machine.

8. The method of claim 1, wherein generating the host resource allocation hierarchy comprises:
    generating a resource allocation setting of a resource pool node based on a resource allocation setting of a client, wherein the client is a child node of the resource pool node and is hosted on the host computer.

9. The method of claim 8, wherein the resource allocation setting of the resource pool node is greater than the resource allocation setting of the client.

10. The method of claim 1, wherein generating the host resource allocation hierarchy comprises:

generating a resource allocation setting of a resource pool node based on resource allocation settings of a plurality of clients that are child nodes of the resource pool node, wherein the clients includes a first client that is hosted on the host computer and a second client that is not hosted on the host computer.

11. The method of claim 10, wherein generating the resource allocation setting of the resource pool node comprises:
generating the resource allocation setting of the resource pool node based on a ratio between the resource allocation setting of the first client and the resource allocation setting of the second client.

12. The method of claim 10, wherein generating the resource allocation setting of the resource pool node comprises:
generating the resource allocation setting of the resource pool node based on a ratio between the resource allocation setting of the first client and the resource allocation setting of the second client and demands of the first client and the second client.

13. The method of claim 10, wherein each of the first client and the second client includes a virtual machine.

14. The method of claim 1, further comprising:
modifying the host resource allocation hierarchy of the host computer to include a client being powered on the host computer or being migrated to the host computer.

15. The method of claim 14, wherein modifying the host resource allocation hierarchy of the host computer comprises:
if the client is migrated to the host computer, generating a resource allocation setting of the client in the modified host resource allocation hierarchy by copying a resource allocation setting of the client in the cluster resource allocation hierarchy.

16. The method of claim 14, wherein modifying the host resource allocation hierarchy of the host computer comprises:
if the client is powered on the host computer, generating a resource allocation setting of the client in the modified host resource allocation hierarchy based on a resource allocation setting of a similar client in the cluster resource allocation hierarchy.

17. A non-transitory computer-readable storage medium containing program instructions for performing a resource allocation for a host computer cluster, wherein execution of the program instructions by one or more processors causes the one or more processors to perform steps comprising:
obtaining a copy of a cluster resource allocation hierarchy of the host computer cluster; and
generating a host resource allocation hierarchy of a host computer in the host computer cluster based on the copy of the cluster resource allocation hierarchy, the host resource allocation hierarchy including a hierarchical relationship of resource nodes associated with the host computer and resource allocation settings of the resource nodes.

18. The non-transitory computer-readable storage medium of claim 17, wherein the steps further comprise:
obtaining a second copy of the cluster resource allocation hierarchy of the host computer cluster; and
generating a second host resource allocation hierarchy of a second host computer in the host computer cluster based on the second copy of the cluster resource allocation hierarchy while the host resource allocation hierarchy is being generated.

19. The non-transitory computer-readable storage medium of claim 17, wherein generating the host resource allocation hierarchy comprises:
removing, from the copy of the cluster resource allocation hierarchy, every resource allocation item that is not presented on the host computer.

20. The non-transitory computer-readable storage medium of claim 17, wherein generating the host resource allocation hierarchy comprises:
removing, from the copy of the cluster resource allocation hierarchy, every virtual machine that is not running on the host computer and every resource pool node that does not include any virtual machine that is running on the host computer.

21. The non-transitory computer-readable storage medium of claim 17, wherein generating the host resource allocation hierarchy comprises:
generating a resource allocation setting of a resource pool node based on resource allocation settings of a plurality of clients that are child nodes of the resource pool node, wherein the clients includes a first client that is hosted on the host computer and a second client that is not hosted on the host computer.

22. The non-transitory computer-readable storage medium of claim 21, wherein generating the resource allocation setting of the resource pool node comprises:
generating the resource allocation setting of the resource pool node based on a ratio between the resource allocation setting of the first client and the resource allocation setting of the second client or demands of the first client and the second client.

23. The non-transitory computer-readable storage medium of claim 17, wherein the steps further comprise:
modifying the host resource allocation hierarchy of the host computer to include a client being powered on the host computer or being migrated to the host computer, wherein modifying the host resource allocation hierarchy of the host computer comprising:
if the client is migrated to the host computer, generating a resource allocation setting of the client in the modified host resource allocation hierarchy by copying a resource allocation setting of the client in the cluster resource allocation hierarchy; and
if the client is powered on the host computer, generating a resource allocation setting of the client in the modified host resource allocation hierarchy based on a resource allocation setting of a similar client in the cluster resource allocation hierarchy.

24. A computer system for performing resource allocation for a host computer cluster comprising:
a processor; and
a resource allocation module operably connected to the processor, wherein the resource allocation module is configured to:
obtain a copy of a cluster resource allocation hierarchy of the host computer cluster; and
generate a host resource allocation hierarchy of a host computer in the host computer cluster based on the copy of the cluster resource allocation hierarchy, the host resource allocation hierarchy including a hierarchical relationship of resource nodes associated with the host computer and resource allocation settings of the resource nodes.

25. The computer system of claim 24, wherein the resource allocation module is further configured to:
obtaining a second copy of the cluster resource allocation hierarchy of the host computer cluster; and
generate a second host resource allocation hierarchy of a second host computer in the host computer cluster based on the second copy of the cluster resource allocation hierarchy while the host resource allocation hierarchy is being generated.

26. The computer system of claim 24, wherein the resource allocation module is further configured to:
    remove, from the copy of the cluster resource allocation hierarchy, every virtual machine that is not running on the host computer and every resource pool node that does not include any virtual machine that is running on the host computer.

27. The computer system of claim 24, wherein the resource allocation module is further configured to:
    generate a resource allocation setting of a resource pool node based on resource allocation settings of a plurality of clients that are child nodes of the resource pool node, wherein the clients includes a first client that is hosted on the host computer and a second client that is not hosted on the host computer.

28. The computer system of claim 27, wherein the resource allocation module is further configured to:
    generate the resource allocation setting of the resource pool node based on a ratio between the resource allocation setting of the first client and the resource allocation setting of the second client or demands of the first client and the second client.

29. The computer system of claim 24, wherein the resource allocation module is further configured to:
    if a client is migrated to the host computer, generate a resource allocation setting of the client by copying a resource allocation setting of the client in the cluster resource allocation hierarchy and modify the host resource allocation hierarchy of the host computer to include the client and the generated resource allocation setting of the client.

30. The computer system of claim 24, wherein the resource allocation module is further configured to:
    if a client is powered on the host computer, generate a resource allocation setting of the client based on a resource allocation setting of a similar client in the cluster resource allocation hierarchy and modify the host resource allocation hierarchy of the host computer to include the client and the generated resource allocation setting of the client.

* * * * *